United States Patent [19]

Forster

[11] Patent Number: 4,887,915
[45] Date of Patent: Dec. 19, 1989

[54] SLIDE SYSTEMS

[75] Inventor: Gervase L. Forster, Jordons, England

[73] Assignee: Hepco Slide Systems Limited, Middlesex, United Kingdom

[21] Appl. No.: 169,898

[22] Filed: Mar. 18, 1988

[30] Foreign Application Priority Data

Mar. 26, 1987 [GB] United Kingdom ............... 8707244

[51] Int. Cl.⁴ ............................................. F16C 29/12
[52] U.S. Cl. ........................................ 384/57; 384/53; 384/58
[58] Field of Search ............... 384/7, 19, 22, 40, 50, 384/53, 57, 58, 129, 247, 252–260, 262, 449, 519, 546, 549, 583; 248/678, 676

[56] References Cited

U.S. PATENT DOCUMENTS

| | | | |
|---|---|---|---|
| 486,299 | 11/1892 | Rowan | 384/57 |
| 1,811,508 | 6/1931 | Klages | 384/53 |
| 2,622,939 | 12/1952 | Ljunggren | 384/53 |
| 2,919,957 | 1/1960 | Harris | 384/57 |
| 3,950,046 | 4/1976 | Lubbersmeyer | 384/546 |

FOREIGN PATENT DOCUMENTS

| | | |
|---|---|---|
| 419446 | 11/1934 | United Kingdom . |
| 650652 | 2/1951 | United Kingdom . |
| 681412 | 10/1952 | United Kingdom . |
| 7078234 | 4/1954 | United Kingdom . |
| 782413 | 9/1957 | United Kingdom . |
| 1100058 | 1/1968 | United Kingdom ............... 384/40 |
| 2145167 | 3/1985 | United Kingdom ............... 384/7 |

Primary Examiner—Thomas R. Hannon
Attorney, Agent, or Firm—Arnold, White & Durkee

[57] ABSTRACT

A one-piece metal mounting device for an adjustable or eccentric bearing of a precision slide system has a spigot forming a journal for the bearing and lateral extensions one of which has an elongate through bore for receiving a hexagon headed adjusting bush and the other has a cylindrical through bore for receiving a screw. The bush also receives a screw, both of which pass into blind threaded holes of a machine bed of the slide system. The device is mounted on the bed and adjusted in a plane parallel to the plane of the bed by adjustment of the bush.

9 Claims, 3 Drawing Sheets

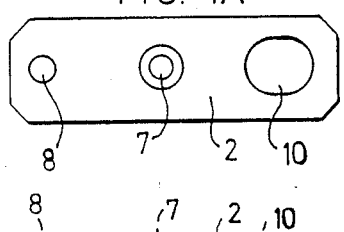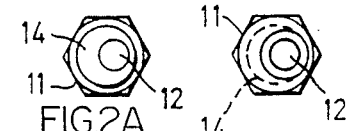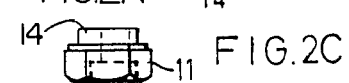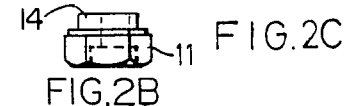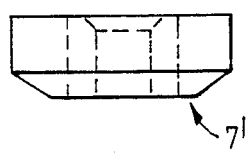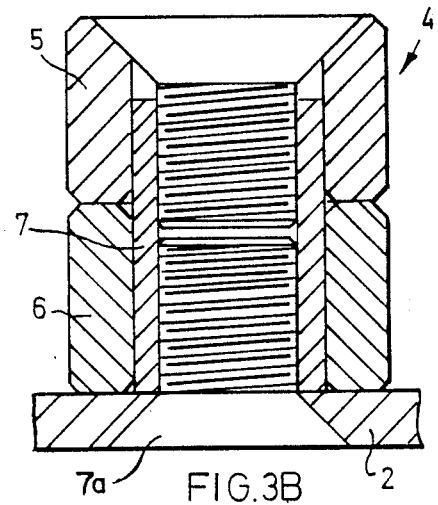

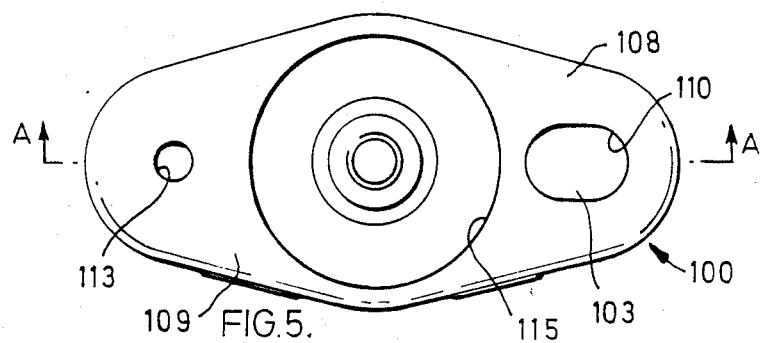
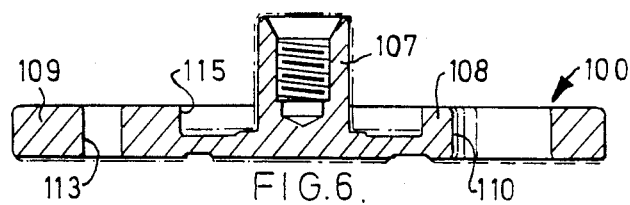
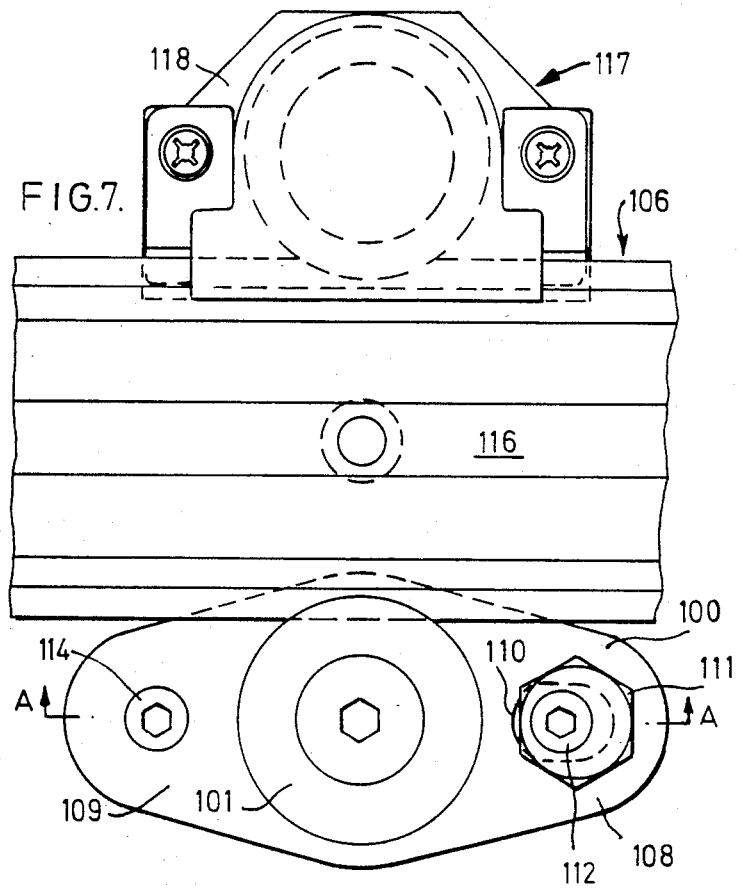

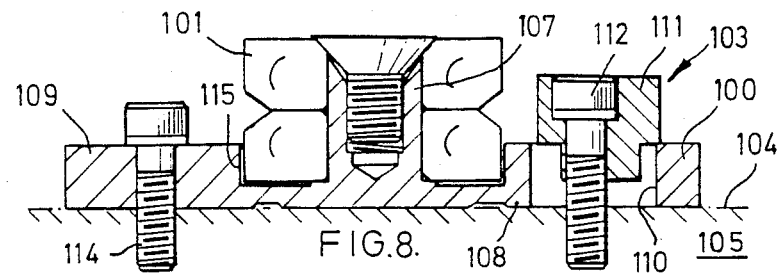
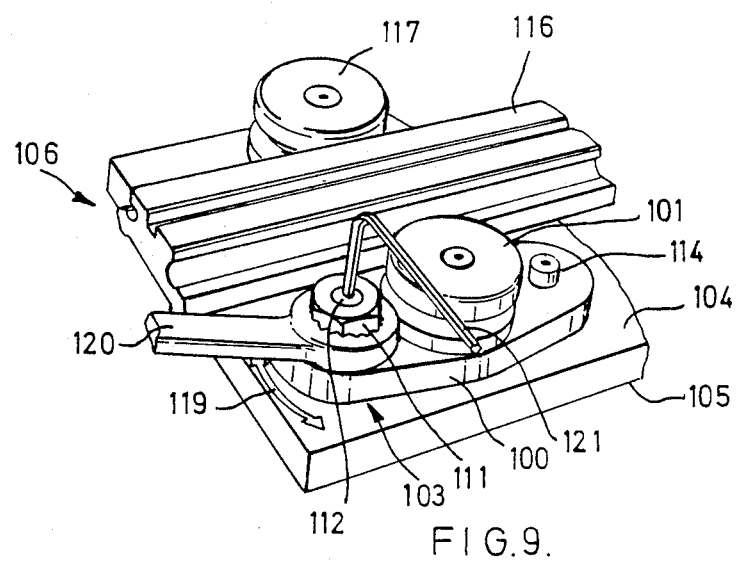

SLIDE SYSTEMS

The invention relates to slide systems.

BACKGROUND OF THE INVENTION

Slide systems such as linearly movable machine slides where precision linear motion is to be provided for printing equipment, machine tools, and the like are known. In such a system a precision ground slide having a precision V-edge is generally guided between a plurality, usually four, precision ground V-angle contact bearings, mounted for rotation on concentric or eccentric studs. The studs are mounted for rotation on a machine bed or base plate, eccentric studs being mounted opposite concentric studs to provide a simple yet effective method of adjusting any free play in the system. The studs usually pass right through the machine bed, which is sometimes impractical when the machine bed is massive, or in a location where access is difficult. Also, the adjustment is usually effected by rotation of a nut, but again this can be inconvenient where access is difficult, or where a flush surface bearing is used.

SUMMARY OF THE INVENTION

It is an object of the invention to overcome the above-mentioned disadvantages.

According to one aspect of the invention there is provided a mounting device for a bearing, comprising means whereby the device may be secured to a substantially planar surface of a substrate and adjusted bodily substantially parallel to the plane of the surface.

The adjusting means may comprise a lateral extension of the device. This construction provides for ease of adjustment.

The securing means may comprise a further lateral extension of the device. This construction provides for ease of securement.

The lateral extensions may be on diametrically opposite sides of the device.

The device may comprise a plate intermediate the ends of which there is a spigot forming or adapted to form a journal for a bearing, and the parts of the plate on either side of the spigot may comprise the lateral extensions. This provides for ease of manufacture.

The plate may be formed integrally in one piece; for example by investment casting of metal.

The adjustment means may comprise an elongate hole through the plate adapted to receive an adjustment means, and the securing means may comprise a circular hole through the plate adapted to receive a further securing means.

The adjustment means may comprise an eccentric bush, bolt, nut or the like.

There may be a support adapted to receive the bearing in use.

The support may comprise a substantially circular web (as considered in plan) in which the bearing may be received in use. This construction provides a relatively strong mounting for the bearing.

According to a second aspect the invention provides a bearing mounted on a device as hereinbefore defined.

According to a third aspect, there is provided a slide system including bearings for mounting a slide of the system, at least one of which bearings is a bearing as hereinbefore defined.

There may be a plurality of bearings which may comprise concentric bearings and eccentric bearings mounted in pairs opposite one another and the eccentric bearings may comprise a bearing as hereinbefore defined.

The concentric bearings may comprise an extension of a journal of the bearing which may be secured directly to a machine plate of the system.

Alternatively, the concentric bearings may comprise a mounting device which may be a casting for the bearing and secured to a machine plate of the system.

BRIEF DESCRIPTION OF THE DRAWINGS

Embodiments of the invention are hereinafter described, by way of example, with reference to the accompanying drawings.

FIGS. 1A and 1B are plan and side views, respectively, of one embodiment of a mounting device according to the invention for a bearing for use in a slide system;

FIGS. 2A, 2B and 2C are top, bottom and side views of an assembly of an eccentric securing and adjusting means for use with the mounting device or carrier of FIG. 1;

FIGS. 3A and 3B are longitudinal sectional views of a bearing according to the invention;

FIG. 4 shows the system in use in a precision slide system;

FIG. 5 is a plan view of a second embodiment of mounting device for mounting a bearing for use in a slide system according to the invention;

FIG. 6 is a longitudinal sectional view of the mounting device of FIG. 5 taken along the line 'A'—'A' of FIG. 5;

FIG. 7 is a plan view of devices of FIGS. 5 and 6 mounting a bearing and used in a slide system according to the invention;

FIG. 8 is a sectional view on line 'A'—'A' of FIG. 7; and

FIG. 9 is a perspective view, to a smaller scale, showing the device of FIGS. 5 to 8 and the adjustment of bearing.

DESCRIPTION OF THE PREFERRED EMBODIMENTS

Referring first to FIGS. 1-4 of the drawings, there is shown a mounting device 2 for a bearing 1 which has a journal 4, the device 1 having lateral extensions in the form of a carrier plate 2 projecting laterally of the bearing 1 which plate is bodily movable with the bearing 1 in relation to a substantially planar surface of a substrate or machine bed 3, whereby to adjust the bearing 1 bodily substantially parallel to the plane of the surface.

The journal 4 comprises two ball race tracks 5 and 6 mounted on a sleeve 7 which extends between both tracks 5 and 6, and which terminates flush with the bottom (in use) track 6, and is secured by securing means such as a screw to the carrier plate 2, the screw head being received in a hole 7a with a countersink. The upper ball race track 5 is secured to the sleeve 7 by a flush fitting screw 7' and by an adhesive such as LOK-TITE to ensure that the whole journal 4 is a single unit. The bearing 1 runs on the ball race tracks 5 and 6.

The carrier plate 2 extends on either side of the bearing 1, and has two further holes, in one 8 of which is mounted a concentric securing means such as a screw or bolt 9 and in the other 10 of which, which is an elongate slot or hole, is mounted an eccentric bolt comprising a hexagonal nut 11 with an offset stud 12 which is flush with the top of the nut, and which has a tool receiving seat.

In use, the bearing is used in a precision slide system 13 like the one shown in FIG. 4, bearing 5 being a concentric bearing of the system mounted on the machine bed 3. Although only one bearing 1 is shown as mounted on a carrier plate 2 according to the invention, all four can be so mounted. To install the bearing 1, tapped holes are provided in the machine bed 3 aligned with the bolts 9 and 12.

The bolt 9 is screwed straight into the machine bed 3. In order to adjust the system and take up any slack, the nut 11 is turned about the untightened bolt 12, in the hole 10 so that its cam extension 14 acts on the side of the hole 10 to throw the carrier plate 2, and thus the bearing 1, with it, bodily in the desired direction towards or away from a slide 15 of the system 13. When the correct position is reached, with the slide 15 and bearing 1 at the correct pressure, the bolt 12 is screwed down into the hole in the machine bed 3 to secure the bearing in position.

The bearing then provides adjustability from on top of the bed without the need to extend the bearing journals through the machine bed 3.

Referring now to FIGS. 5 to 9, there is shown an embodiment of mounting device 100 for a bearing 101, comprising means 103 whereby the device 100 may be secured to a substantially planar surface 104 of a substrate, such as a machine bed 105 of a precision slide system 106 (part of which is shown in FIGS. 7 and 9), and adjusted bodily substantially parallel to the plane of the surface 104.

The mounting device 100 is a plate formed as an integral, or one piece, casting, such as an investment casting in metal, and comprises an upstanding spigot 107 which forms a journal for the bearing 101, parts 108 and 109 of the plate 100 on diametrically opposite sides of the journal 107 forming lateral extensions. One such extension 108 has an elongate through hole 110 for receiving an eccentric hexagon bush 111 secured to the machine bed 105 by socket-headed securing means such as a bolt 112 which screws down into a blind threaded hole in the machine bed 105. The other extension 109 has a through bore 113 for receiving a securing means such as a socket-headed screw or bolt 114 which again screws down into a blind threaded hole in the machine bed 105.

The plate 104 includes a wall or web 115 which defines a seating in which a lower part of the bearing 101 is received, and strengthens the whole structure 100 as well as offering support (FIG. 8).

The mounting device 100 and bearings 101 carried thereby are used to support a slide 116 of the precision slide system 106. The bearings which support such a slide for usually reciprocable motion are usually mounted in groups of four (like FIG. 4) there being two concentric bearings and two eccentric bearings mounted in opposite pairs of which only one pair is shown in FIGS. 7 and 9. The bearing 101 is an eccentric bearing mounted on the mounting device 100 and is opposite a concentric bearing 117. (In FIG. 7 the bearing 117 is shown in a cap seal device 118). The concentric bearing 117 is mounted on the machine bed 105 (above which the slide 116 is supported by its V-edges in V-grooves of the bearings) by an extension of its journal which is screwed directly into a blind hole in the machine bed 105. Alternatively, the concentric bearing is mounted on a journal of a mounting device such as casting (not shown) which is itself mounted as by screwing securing means such as screws or bolts into blind holes of the machine bed 105, the securing means passing through through holes of lateral extensions of the casting, both holes being circular like that 113 (FIGS. 5,6) rather than one being elongate.

The mounting device for the concentric journal 117 is thus not progressively angularly adjustable with reference to the plane of the mounting plane as is the eccentric bearing 101. To effect such progressive angular adjustment of the eccentric bearing 101 the mounting device 100, having been mounted on the mounting plate 105 by the screws 112, 114 is progressively adjusted in the required direction as shown by arrow 119 by applying a tool such as an adjusting spanner 120 to the hexagon bush 111 which is rotated as desired to provide a desired pre-load on the slide 116, as shown by a load setting tool (not shown).

The bearings 117, 101 are then tightened when the correct load setting has been achieved, by a key such as an Allen Key 121.

The mounting devices 100 described herein which embody the invention and are shown in the drawings thus provide for mounting the journals into a solid machine base where access to its underside and the use of a conventional clearance hole and fixing nut is restricted, e.g. a standard four journal configuration (two concentric, two eccentric).

The slide is thus guided between four journal assemblies, two of which are concentric, with the opposing two being adjustable eccentric, used to effect the correct 'no play' situation. Depending on the preload introduced into the system during setting, the coefficient of friction can be in the region of 0.005 for a light preload and 0.02 for a heavy preload.

The eccentric feature also gives the benefit of minimizing the accuracies required when drilling the journal mounting holes.

I claim:

1. A mounting device for a bearing, comprising:
    a carrier plate having means for securing said device to a substantially planar surface of a substrate, said means for securing comprising a first lateral extension of said carrier plate;
    a spigot for supporting said bearing, said spigot being fixed to said carrier plate; and
    means for adjusting said device in a plane substantially parallel to said planar surface of said substrate, said means for adjusting comprising a second lateral extension of said carrier plate diametrically opposite said first lateral extension, an elongate hole formed through said second lateral extension of said carrier plate, and an eccentric bush disposed in said elongate hole, said eccentric bush being rotatably secured to said planar surface of said substrate.

2. A mounting device according to claim 1, wherein said means for securing further comprises a substantially circular hole formed through said first lateral extension.

3. A mounting device according to claim 1, wherein said carrier plate has an elongate shape and said spigot is fixed to said elongate carrier plate on an axis substantially normal thereto at a location substantially intermediate between said first and second lateral extensions.

4. A mounting device according to claim 3, wherein said device is an integral, one-piece member.

5. A mounting device according to claim 3, wherein said device is an integral, one-piece investment casted metal member.

6. A mounting device according to claim 3, wherein said elongate carrier plate further comprises a substantially circular web formed in a surface of said plate substantially coaxial with said spigot, said circular web partially housing said bearing.

7. A slide system comprising:
 a slide member supported by a plurality of bearings, said bearings comprising concentric and eccentric bearings secured to a substantially planar surface of a substrate of said slide system by a plurality of bearing mounting devices, each of said plurality of bearing mounting devices which secures each of said eccentric bearings comprising:
 (a) a carrier plate having means for securing said device to said substrate, said means for securing comprising a first lateral extension of said carrier plate;
 (b) a spigot for supporting said bearing, said spigot being fixed to said carrier plate; and
 (c) means for adjusting said device in a plane substantially parallel to said planar surface of said substrate, said means for adjusting comprising a second lateral extension of said carrier plate diametrically opposite said first lateral extension, an elongate hole through said second lateral extension of said carrier plate, and an eccentric bush disposed in said elongate hole, said eccentric bush being rotatably secured to said planar surface of said substrate.

8. A slide system according to claim 7, wherein said concentric and eccentric bearings are mounted in pairs opposite one another on opposite sides of said slide member.

9. A slide system according to claim 7, wherein each of said concentric bearings comprises an extended journal which is secured directly to said substrate.

* * * * *